Figure 5:

T. H. MILLER.
SPRING FOR SPRING BEARINGS.
APPLICATION FILED OCT. 1, 1910.
1,107,690.
Patented Aug. 18, 1914.
2 SHEETS—SHEET 1.
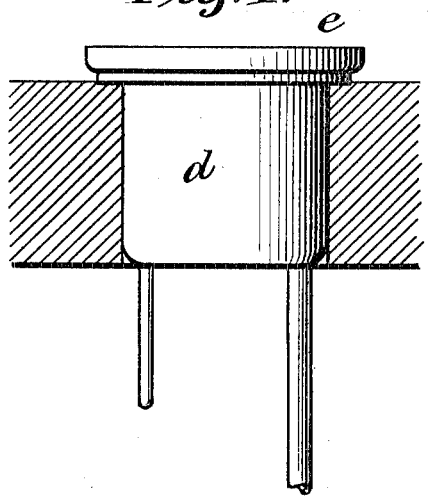
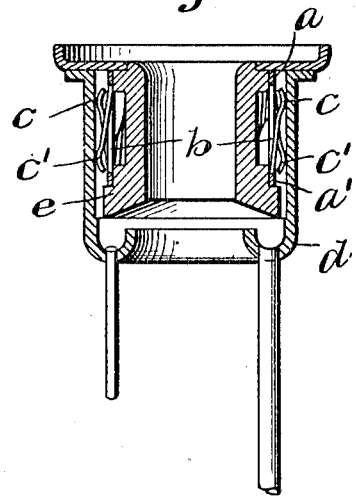
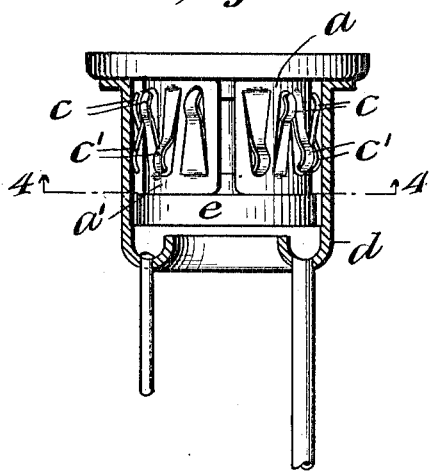
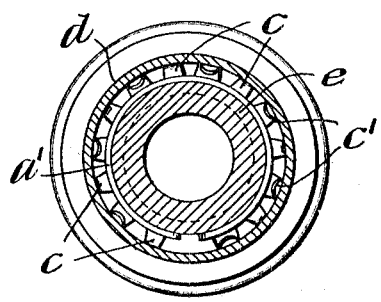
WITNESSES
Daniel Webster, Jr.
E. E. Wall
INVENTOR
Theodore H. Miller
BY
Harding & Harding
ATTORNEYS

T. H. MILLER.
SPRING FOR SPRING BEARINGS.
APPLICATION FILED OCT. 1, 1910.

1,107,690.

Patented Aug. 18, 1914.
2 SHEETS—SHEET 2.

UNITED STATES PATENT OFFICE.

THEODORE H. MILLER, OF POUGHKEEPSIE, NEW YORK, ASSIGNOR TO THE DE LAVAL SEPARATOR COMPANY, A CORPORATION OF NEW JERSEY.

SPRING FOR SPRING-BEARINGS.

1,107,690.  Specification of Letters Patent.  Patented Aug. 18, 1914.

Application filed October 1, 1910. Serial No. 584,785.

*To all whom it may concern:*

Be it known that I, THEODORE H. MILLER, a citizen of the United States, residing at Poughkeepsie, county of Dutchess and State of New York, have invented a new and useful Improvement in Springs for Spring-Bearings, of which the following is a full, clear, and exact description, reference being had to the accompanying drawings, which form a part of this specification.

My invention relates to a spring for a spring bearing particularly adapted for separators.

In such apparatus as centrifugal liquid separators, which necessarily revolve at a high rate of speed, the revolving spindle is provided with a spring which is inserted between the bearing and the frame of the machine or other outer support.

It is the object of my invention to produce a spring for such bearings which will have the following advantages: maximum flexibility, avoidance of reduction in the size of the main body of the spring for the bearing, avoidance of tendency to rotation of the spring, and balancing of pressure, *i. e.* providing application points for pressure contact at a plurality of lines in the length of the spring. I accomplish this result by my novel spring in which I provide a plurality of spring fingers projecting at different points so as to form a plurality of lines of contact between the bearing and its support. In the preferred form said fingers extend alternately in opposite directions from the points of connection, thus forming a plurality of lines of contact around the spring, between the points of connection of the fingers. Preferably I also provide intermediate bridge pieces which connect the cylindrical supporting connections. Preferably I also provide solid portions which extend the length of the spring from which the spring fingers project inwardly or outwardly.

In the most preferred form of my invention, I form the spring for the spring bearing from a sheet of metal. From this metal I stamp up spring fingers so as to leave a solid continuous cylindrical portion at top and bottom. The spring fingers project alternately from such top and bottom portion so that the ends of said fingers of each set are in line with each other, but the ends of the fingers of the two sets are, with respect to each other, out of alinement.

I will now describe the embodiments of my invention shown in the accompanying drawings.

Figure 6:
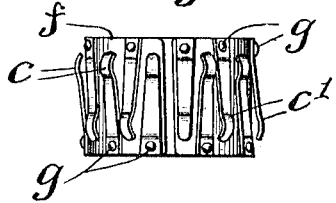

Figure 1 is a side elevation of an embodiment of my invention. Fig. 2 is a vertical cross section of same. Fig. 3 is a sectional elevation similar to Fig. 2. Fig. 4 is a cross section on line 4—4 of Fig. 3. Fig. 5 is a view showing another form of embodiment of my spring for bearing. Fig. 6 is a view showing another form of embodiment of my spring for bearing.

The spring (as shown in Figs. 1–4) is formed from a piece of sheet metal so that it has a continuous cylindrical surface $a$, $a'$, at top and bottom, which surface is of some width, and a width sufficient to produce, by its contact with the bearing, such friction as to reduce its tendency to rotate, and if at all, to lessen the consequent wear on the bearing. From this metal is stamped up spring fingers $c$, $c'$, alternately projecting from the upper portion $a$ and the lower portion $a'$. On each side of these spring fingers are metal sections, or bridges, $b$, which extend from portion $a$ to portion $a'$. In the form shown in Fig. 5 the portion $f$, corresponding to the portions $a$ and $a'$ of the embodiment of Figs. 1–4, is continuous not only in length but also in width or height of the spring, and the spring fingers $c$, $c'$ are bent alternately from the upper and lower edges of said portion $f$. The form shown in Fig. 6 differs from that shown in Fig. 5 in that the spring fingers $c$, $c'$ are connected to the portion $f$ by rivets $g$. In all these constructions the spring for the bearing, as a whole, does not yield but only the spring fingers, thus maintaining the size of the spring constant and decreasing the tendency to rotate. Further, the solid portions $a$, $a'$ (Figs. 1–4) and $f$ (Figs. 5 and 6) also assist in preventing rotation and thus avoid cutting and wearing. Again, as may be seen, one set of fingers extends the same distance and have their points of pressure application on a line, and the same is true with the other set of fingers, but such points in the two sets are on different lines, hence I have a balancing pressure. The spring fingers $c$, $c'$, as shown, project outwardly and contact with the outer support. By merely reversing i. e. having the spring fingers project inwardly, the same construction is present, the only difference being that the fingers then contact with the bearing or inner support.

$d$ is the bearing and $e$ is the frame or support, a spring being inserted, as shown in the drawings, between the bearing and the frame or support.

Having now fully described my invention, what I claim and desire to protect by Letters Patent is:

1. A spring for a spring bearing, comprising a metal sheet, two sets of spring fingers projecting from said sheet in opposite directions, the line of contact of one set of fingers being in one horizontal plane, and the line of contact of the other set of fingers being in another horizontal plane, and both sets of fingers extending throughout the zone between said planes.

2. A spring for a spring bearing, comprising a metal sheet, spring fingers projecting from said sheet, said fingers being attached to the sheet at one side of the center of the sheet and extending beyond and having their points of contact on the opposite side of the center of said sheet.

3. A spring for a spring bearing comprising a metal sheet, sets of spring fingers projecting from said sheet, each set of spring fingers being attached to the sheet at one side of the center of the sheet, and the sets with respect to each other on opposite sides of the center, each set of fingers extending and having their points of contact beyond the center of the sheet and on opposite sides of the center with respect to each other.

4. A spring for a spring bearing, consisting of spring fingers, each having a supporting connection at one end only, and extending alternately upward and downward from points of connection respectively below and above a horizontal plane intersecting all the fingers, the points of contact of the upwardly extending fingers being above the points of contact of the downwardly extending fingers.

5. A spring for a spring bearing, comprising a metal sheet and having a solid portion at the top and a solid portion at the bottom extending the length of the spring, spring fingers between said solid portions, said spring fingers extending alternately from the upper solid portion toward the lower solid portion and from the lower solid portion toward the upper solid portion, the contacts of each set of fingers being beyond the center of the bearing and in alinement, and the contacts of the two sets with respect to each other being on opposite sides of the center of the street.

6. A spring for a spring bearing, comprising a metal sheet and having a solid portion at the top and bottom extending the length of the spring, two sets of spring fingers between said solid portions, one set of spring fingers extending from the upper solid portion toward the lower solid portion and the other set of spring fingers extending from the lower solid portion toward the upper solid portion, the contacts of each set of fingers being beyond the center of the bearing and in alinement, and the contacts of the two sets with respect to each other being on opposite sides of the center of the sheet.

7. A spring for a spring bearing, consisting of staggered spring fingers, having a cylindrical supporting connection at one end only, and extending alternately upward and downward from such points of connection, the contacts of said fingers from each end being in alinement with each other, the contacts of one set of fingers being out of alinement with the contacts of the other set of fingers, said fingers extending and having their contacts beyond the center of the bearing.

8. A spring for a spring bearing, having upwardly and downwardly extending spring fingers, the upwardly projecting fingers extending from below the upper ends of the downwardly extending fingers and having their contacts above the contacts of the downwardly projecting fingers.

In testimony of which invention, I have hereunto set my hand at Poughkeepsie, on this 26 day of Sept., 1910.

THEODORE H. MILLER.

Witnesses:
H. C. BARKER,
WILLIAM T. F. REILLY.

Copies of this patent may be obtained for five cents each, by addressing the "Commissioner of Patents, Washington, D. C."